United States Patent [19]

Stephenson et al.

[11] 4,324,754
[45] Apr. 13, 1982

[54] METHOD OF INSERTING A POWDER IN THE MANUFACTURE OF ELECTRICAL DRY CELLS

[75] Inventors: Edward G. Stephenson, Tyne and Wear; Tom Taylor, Newcastle-upon-Tyne, both of England

[73] Assignee: Crompton Parkinson Limited, Leeds, England

[21] Appl. No.: 55,142

[22] Filed: Jul. 6, 1979

[30] Foreign Application Priority Data

Jul. 13, 1978 [GB] United Kingdom ............... 29768/78

[51] Int. Cl.³ .............................................. B28B 1/24
[52] U.S. Cl. ................................. 264/268; 264/328.11
[58] Field of Search ..................... 264/112, 268, 328.11

[56] References Cited

U.S. PATENT DOCUMENTS

| | | | |
|---|---|---|---|
| 1,516,632 | 11/1924 | Olaneta | 264/112 |
| 2,654,913 | 10/1953 | Maier | 264/268 |
| 2,963,738 | 12/1960 | Brandes | 264/268 |
| 3,446,882 | 5/1969 | Landon | 264/112 |

FOREIGN PATENT DOCUMENTS 1067949 5/1967 United Kingdom .

Primary Examiner—James R. Hall
Attorney, Agent, or Firm—Larson and Taylor

[57] ABSTRACT

A method of inserting a slug of powdery depolarizer material into a can as a step in the manufacture of an electrical dry cell, comprises extruding the material along a passage by a ram, which over the first part of its stroke consolidates the material against the effect of a restriction in the passage and then injects the consolidated material through a nozzle into the container, so as to fill the can in a single stroke of operation, the bottom of the can starting close to the nozzle and then progressively moving away from it at a rate which is directly proportional to that of the ram, under positive control by a cam. The working end of the ram is preferably formed with a recess communicating with the outer surface of the ram by way of one or more bleed holes, which is or are closed just before extrusion starts, whereby a substantially constant volume of material is injected for each stroke of the ram, each bleed hole being in the form of a circumferentially extending slot of which the length can be adjusted by rotation of a slotted outer sleeve. The ram reciprocates in a vertical direction, and a reservoir for powdery material extends horizontally around the mouth of the compression, being fitted with a paddle for sweeping material into the mouth of a compression cylinder prior to each stroke of the ram.

4 Claims, 14 Drawing Figures

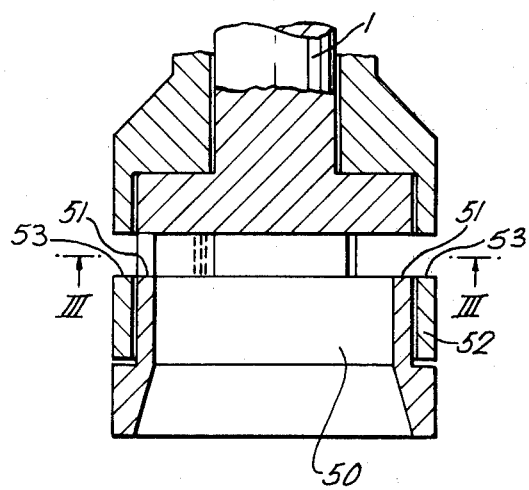
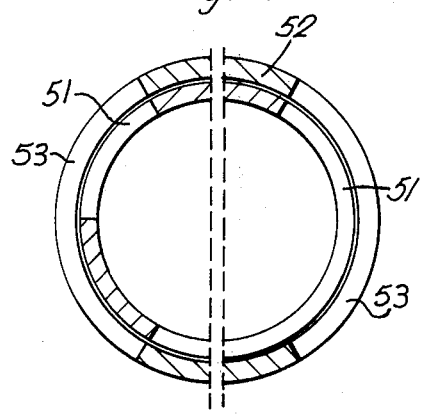

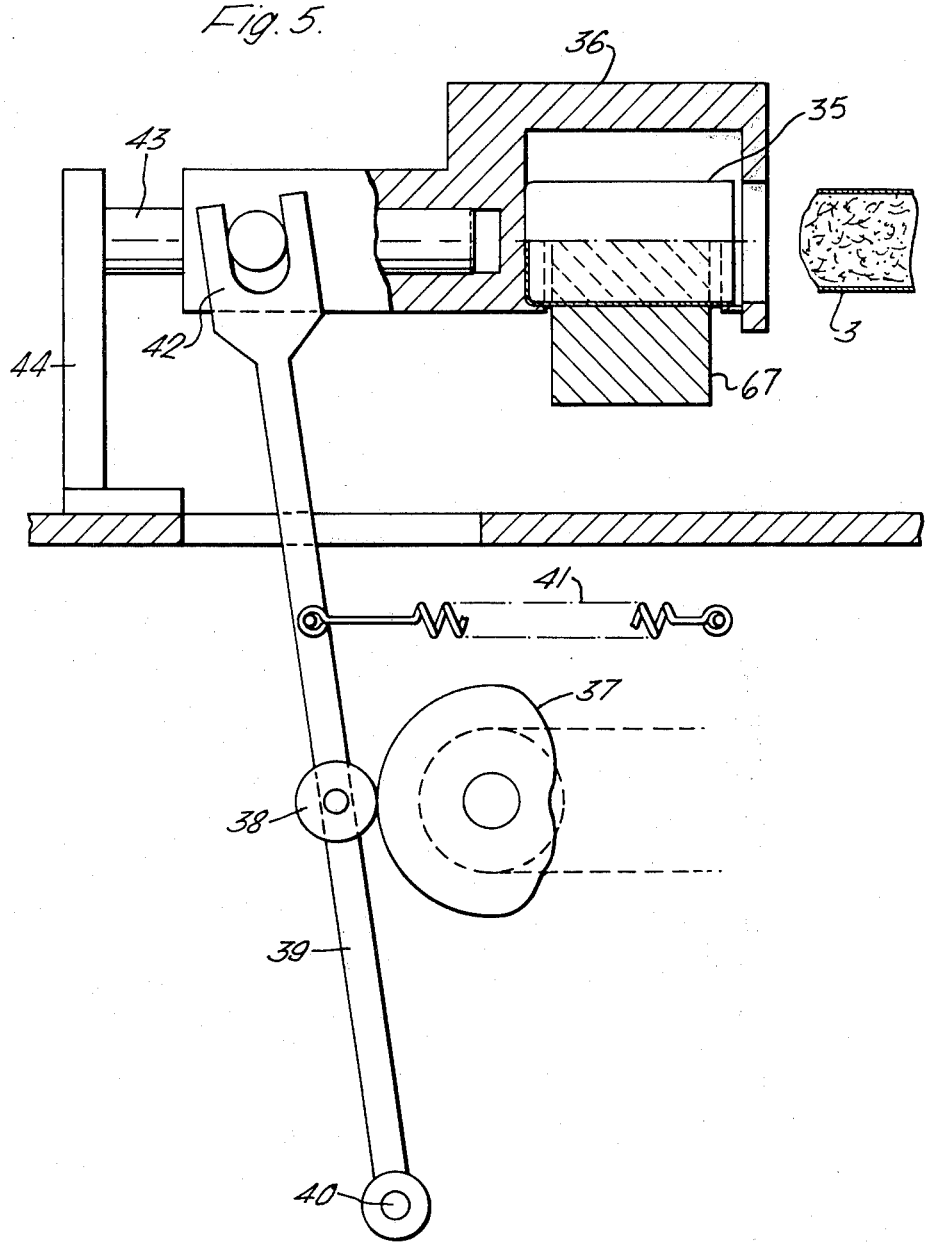

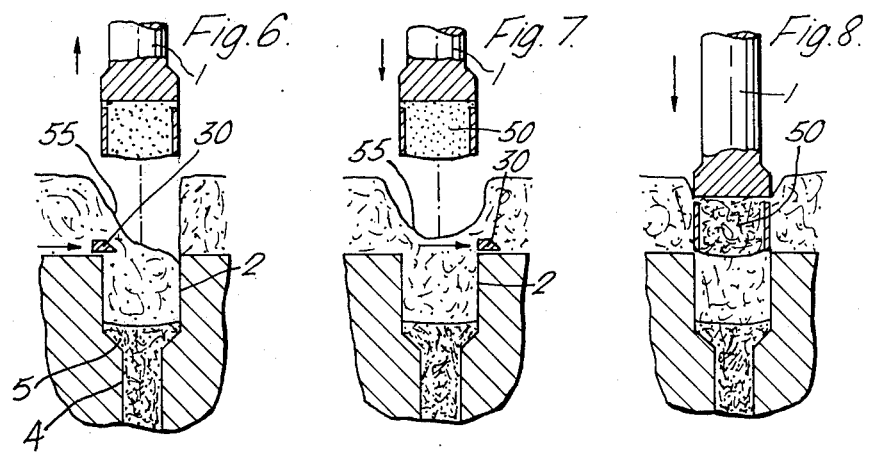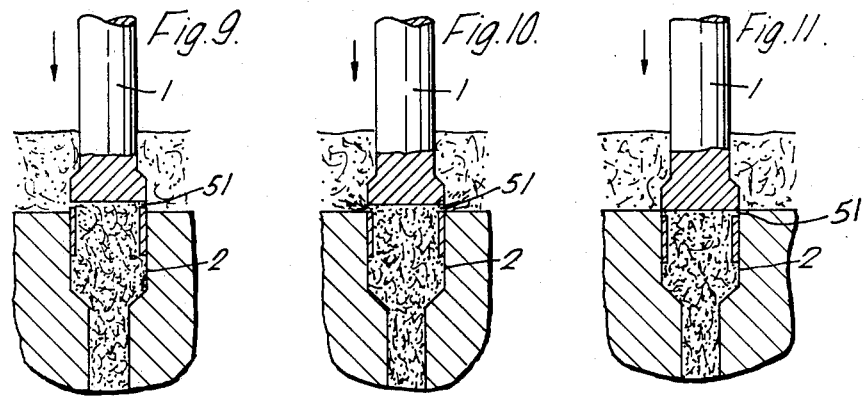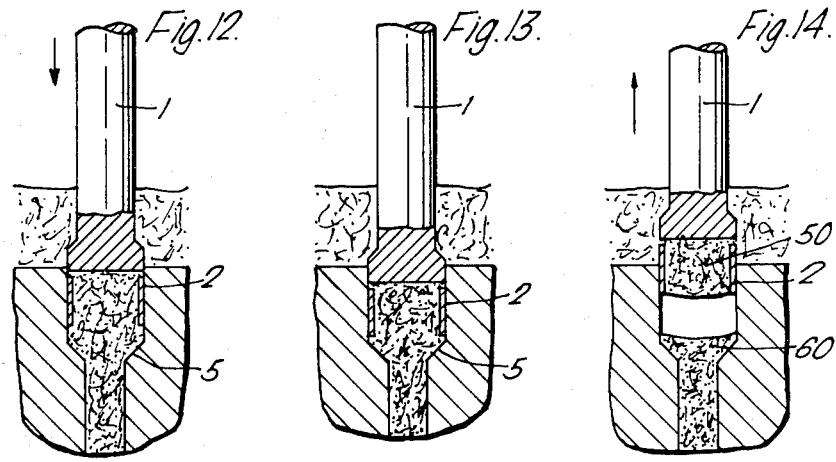

METHOD OF INSERTING A POWDER IN THE MANUFACTURE OF ELECTRICAL DRY CELLS

In the manufacture of electrical dry cells, it is commonly necessary to insert a slug of mixed materials into a container, thus forming the basis of the cell. For example, in a dry cell of the paper-lined Leclanché type, (i.e. cells having a carbon cathode covered with de-polariser and a zinc anode in an ammonium chloride paste) the zinc can is first lined with paper and a slug of depolarising mix is then inserted. Similar requirements apply to other types of cell, but the invention is primarily concerned with Leclanché cells and the following description will therefore be restricted to cells of this type, although it is to be understood that the general principles involved are applicable to cells of other types, such as carbon-zinc, mercuric oxide-zinc and air depolarised cells.

The depolarising material normally used in cells of the Leclanché type and known in the trade as "black mix" comprises basically a mixture of manganese dioxide, carbon black and liquid. It is common practice to extrude this mixture through a nozzle into each successive, paper-lined can. The mixture arrives at the extrusion head in the form of a loose, lumpy mass which needs to be consolidated to give a substantially homogeneous constitution during the extrusion process. In one common method of operating, the nozzle is inserted into each successive can as far as a point close to the bottom of the can which is spring loaded and thus moves back against the spring pressure under the force exerted by the mix extruded into the can. As a consequence, the consolidation process occurs during extrusion and the nozzle is required to form a fairly close fit with the mouth of the can so as to prevent the extrusion pressure forcing the mix out through the gap between the nozzle and the wall of the can. The pressure at any time is solely dependent on the rate of the controlling spring which leads to the inevitable risk of variations in density of the extruded slug and, moreover, the close fit between the nozzle and the mouth of the can involves a high risk of contamination of the latter.

As an alternative to the process just described, the steps of consolidation and extrusion may be separated from one another so that the mix is consolidated before it is extruded, but it is then necessary to fill the can as the result of a series of successive steps of extrusion.

According to the present invention, the material to be inserted into the container (whether of a Leclanché cell or other type of cell) is extruded along a passage by a ram, which over the first part of its stroke consolidates the material against the effect of a restriction in the passage and then injects the consolidated material through a nozzle into the container, so as to fill the container in a single stroke of operation, the mouth of the nozzle starting close to the bottom of the container and then progressively separating from it at a rate which is directly proportional to that of the ram, depending on the relative cross sections of the nozzle and the ram. If, for example, there two cross sections are the same, the rate of separation, preferably resulting from movement of the can under direct mechanical control, may be exactly equal to the rate of travel of the ram so that, as a pre-consolidated slug is extruded, the space available to receive it increases accordingly.

Since there is little, if any, consolidation of the mix while it is actually in the can, there is no risk of the mix being extruded from the can in the gap between the nozzle and the mouth of the can and this allows the clearance between the nozzle and the mouth of the can to be sufficient to avoid any substantial risk of traces of the mix forming a bridge between the body of the mix in the cell and the wall of the can which would cause a short circuit after the completion of assembly. Generally speaking the rate of increase of the available volume between the end of the nozzle and the bottom of the can will be substantially equal to the rate of extrusion of the slug; it is possible for it to be slightly less, which will cause a slight degree of further consolidation within the can itself, but without the risk of extrusion of the mix between the mouth of the nozzle and the wall of the can as just referred to, but the rate of increase of the available volume in the can should not be greater than the rate of extrusion since this leads to the risk of possible voids.

This avoids the risk of particles of mix bridging between the main slug and the wall of the can as just mentioned, which in its turn allows more latitude in the necessary degree of registration between the nozzle and the mouth of the can. Also by avoiding the use of a spring for controlling movement of the can and hence the degree of consolidation, the latter can be rendered substantially constant, leading to substantially uniform density throughout the body of mix and consequently improved performance in the cell.

As mentioned above, the pre-consolidation depends on the ram acting against a restriction in the path of flow between the ram and the nozzle. The cross section of the passage in question may be reduced to a substantial extent at a point just beyond the end of travel of the ram so that the mix is forced into a passage of smaller cross section and is thereby consolidated, the degree of consolidation preferably being to what may be termed "terminal density", that is to say the maximum density obtainable without the water content of the mix being expressed from the solid constituents.

The volume of the extruded slug of mix must, of course, be matched to the capacity of the can and is primarily dependent on the stroke of the ram. There is a secondary factor also, however, which is of importance for the attaining of accurate results. In practice, there needs to be a reservoir of unconsolidated mix immediately above the compression cylinder within which the ram works, the ram withdrawing completely from the compression cylinder on the return stroke so as to allow a further quantity of mix to pass into the compression chamber to make up for the slug extruded by the previous stroke. If the volume of mix passing into the compression chamber on each stroke varies, as will normally be the case, there will inevitably be minor variations in the volume of the extruded slugs, despite the constant stroke of the ram.

Preferably, therefore, the working end of the ram is formed with a recess which communicates with the outer surface of the ram by one or more bleed holes or ports. Accordingly, as the ram enters the compression cylinder it will progressively consolidate the quantity of mix in the cylinder until a pressure is reached (which is transmitted back through the quantity of mix retained in the recess in the ram) which is sufficient to overcome the resistance afforded by the ports and thus to bleed off any excess quantity of mix.

This point is reached just before the port or ports enter the compression cylinder, the port or ports then being closed by engagement with the wall of the cylinder and thus preventing any further bleeding. In this way, it is possible to provide a fine control over the volume of mix included in each slug which, as mentioned above, is determined primarily by the stroke of the ram.

Apparatus according to the invention for carrying out the process just described comprises a reciprocatory ram operative to press material into a compression cylinder and to force it along a passage to a nozzle, the passage being formed with a flow restriction beyond the limit of the stroke of the ram, whereby the material is consolidated, a holder for supporting a container in a position surrounding the nozzle and mechanism for producing relative movement between the holder and the nozzle so that the bottom of the container is separated from the nozzle during the injection of the slug from the nozzle at a rate which is directly proportional to that of the ram.

The nozzle is preferably fixed, as mentioned previously, and the holder is moved under positive cam control. Preferably also the working end of the ram is formed with a recess communicating with the outer surface of the ram by way of one or more bleed holes which is or are closed just before extrusion starts.

The ram conveniently reciprocates in a vertical direction, and a reservoir for powdery material extends horizontally around the mouth of the compression cylinder being fitted with a paddle for sweeping material into the mouth of the compression cylinder prior to each stroke of the ram. Preferably the level of mix within the reservoir is maintained at a substantially constant height, by regulating the feed from a supply pipe by means of an automatic level control, thus further improving the overall consistency of operation.

In a preferred form of apparatus in accordance with the invention, the operation during each cycle is as follows:

Firstly as the ram enters the compression cylinder, it consolidates a quantity of mix swept into the cylinder by the action of the paddle referred to above. This quantity of mix is compressed between the recessed end of the ram and the volume of mix consolidated during the previous cycle, but not extruded. As the ram approaches the end of this first phase of its operation, the pressure reaches a value at which excess mix is forced out through the bleed ports and returns to the main body of mix in the reservoir. After a further short interval during which the ram continues to enter the compression cylinder, the bleed ports are closed by the walls of the cylinder and the effect of further movement of the ram is firstly to increase the consolidation of the quantity of mix now trapped in the compression cylinder and then to extrude a slug of the material from the nozzle into the can, the stroke of the ram being such as to fill the can to the required level.

During this extrusion step, the can moves away from the nozzle under mechanical control, as previously described, so that a substantially constant density slug is produced with little or no additional consolidation as it enters the can. The return stroke of the ram then begins and the action of the cam-controlled movement of the can separates the slug of extruded mix from that remaining in the nozzle and which will subsequently be extruded into the next can. The can then moves away and is replaced by the next can. During the further withdrawal of the ram, the consolidated mix held in the recess at the end of the ram is separated from that remaining in the compression cylinder and the movement of the ram then continues until it leaves the compression cylinder entirely, thus allowing a short time interval for a further quantity of loose mix to be swept into the entrance of the compression cylinder, after which the cycle is repeated.

The pressure at which bleeding starts will depend upon the nature of the mix being used and the resistance offered by the bleed ports. In order to allow for different conditions of mix, the area of the bleed port or ports can be made adjustable, for example by the provision of a rotary sleeve mounted on the outside of the ram. If this is screwed to the ram, rotation of the sleeve provides a fine adjustment of the length of the port in an axial direction; alternatively, by appropriate shaping of the sleeve, it can be caused to act as a shutter so as to control the circumferential extent of each port.

As previously explained, it is essential that the separation of the can from the nozzle during extrusion, preferably by movement of the can away from the nozzle, is directly proportional to the movement of the ram during the extrusion part of its stroke and both the movement of the can away from the nozzle and the movement of the ram are conveniently achieved by way of appropriately shaped cams which are mechanically inter-linked so as to turn together. For example, the ram may move in a vertical direction, being connected to a cross head between a pair of vertical links which, at their lower ends, are connected to a lever which, in its turn, is connected to an eccentric. The nozzle may extend horizontally, being connected to the compression cylinder by way of a right angle bend and the can therefore needs to be moved in a horizontal direction away from the nozzle. For this purpose, it may be mounted in a holder at the upper end of a vertical arm which is pivoted at its lower end and carries at an intermediate point a cam follower co-operating with a cam which is mechanically inter-linked with the eccentric driving the ram and which is so shaped as to produce the required proportional movement of the can during the extrusion part of the stroke of the ram.

An example of apparatus constructed in this manner and operating in accordance with the invention will now be described, with reference to the accompanying drawings, in which:

FIG. 2 is a sectional elevation to an enlarged scale and showing further details of the operating end of the extrusion ram shown in FIG. 1;

FIG. 3 is a cross sectional view, the left side of which is a partial view taken on the line III—III in FIG. 2 and the right side of which shows these same elements in a moved position;

FIG. 5 is an enlarged elevation partly in section and showing further details of the drive for a holder for a can receiving extruded material; and FIGS. 6 to 14 are diagrammatic views showing successive stages in the operation of the ram;

Figure 1:
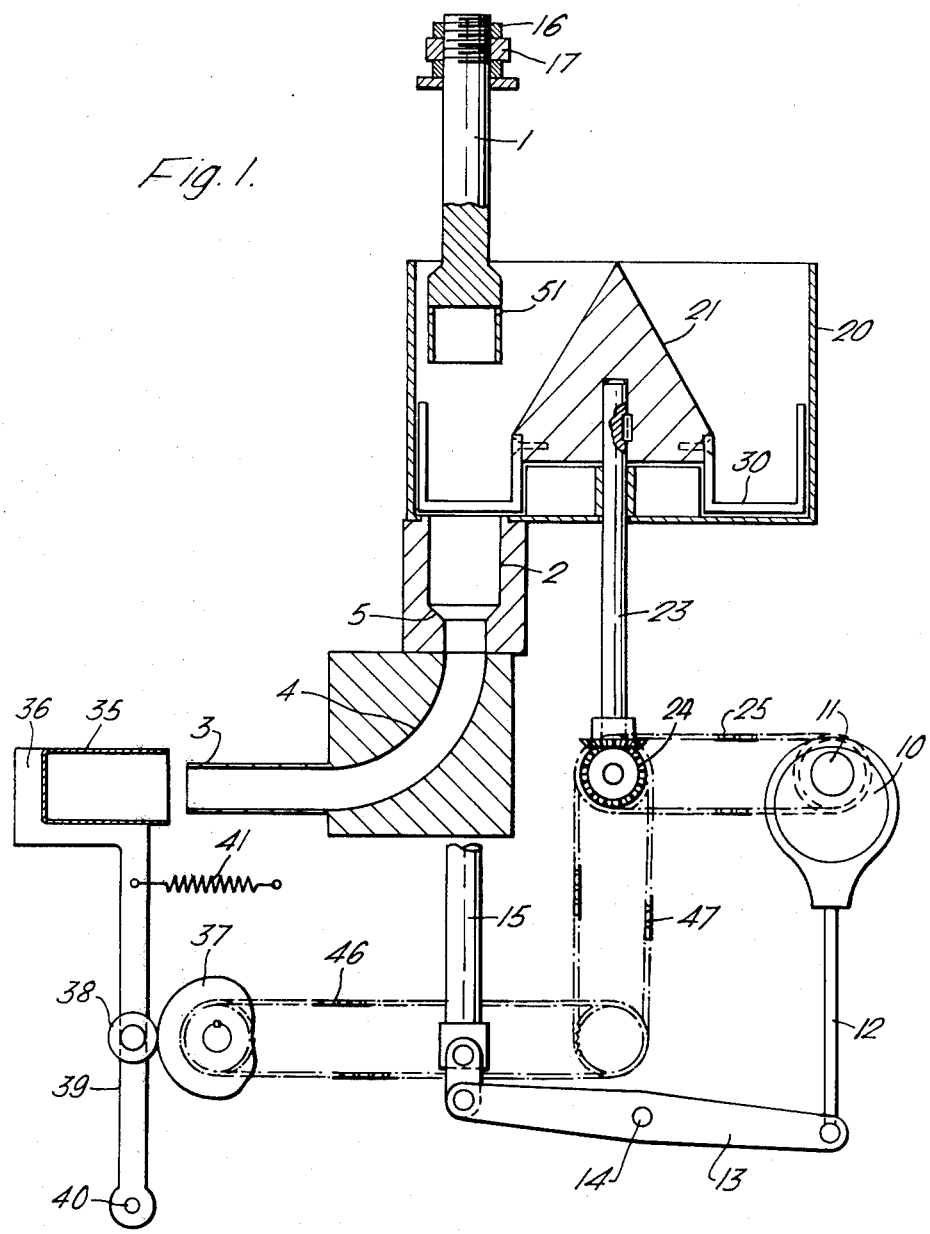
FIG. 1 is a sectional partially schematic elevation of the apparatus as a whole.

Turning first to FIG. 1, the apparatus comprises an extrusion ram 1 which co-operates with a compression cylinder 2 communicating with an extrusion nozzle 3 by way of a smoothly curved passage 4. A restriction in the passage is caused by a reduction in cross section at 5 immediately below the compression cylinder 2. The ram 1 is caused to reciprocate in a vertical direction by means of an eccentric 10 driven by a shaft 11 and connected by a rod 12 to a lever 13 which is pivoted at its midpoint at 14 and connected at its opposite end to a pair of vertical links of which only the bottom portions are seen at 15. Although omitted from FIG. 1, these extend upwardly alongside the body of the ram 1 to a cross head 16 which is adjustably connected to the upper end of the ram 1 by a screw connection 17. This fine adjustment varies the proportion of the stroke of the ram during which it is within the compression cylinder 2 and thus varies the volume of extruded material.

Figure 4:
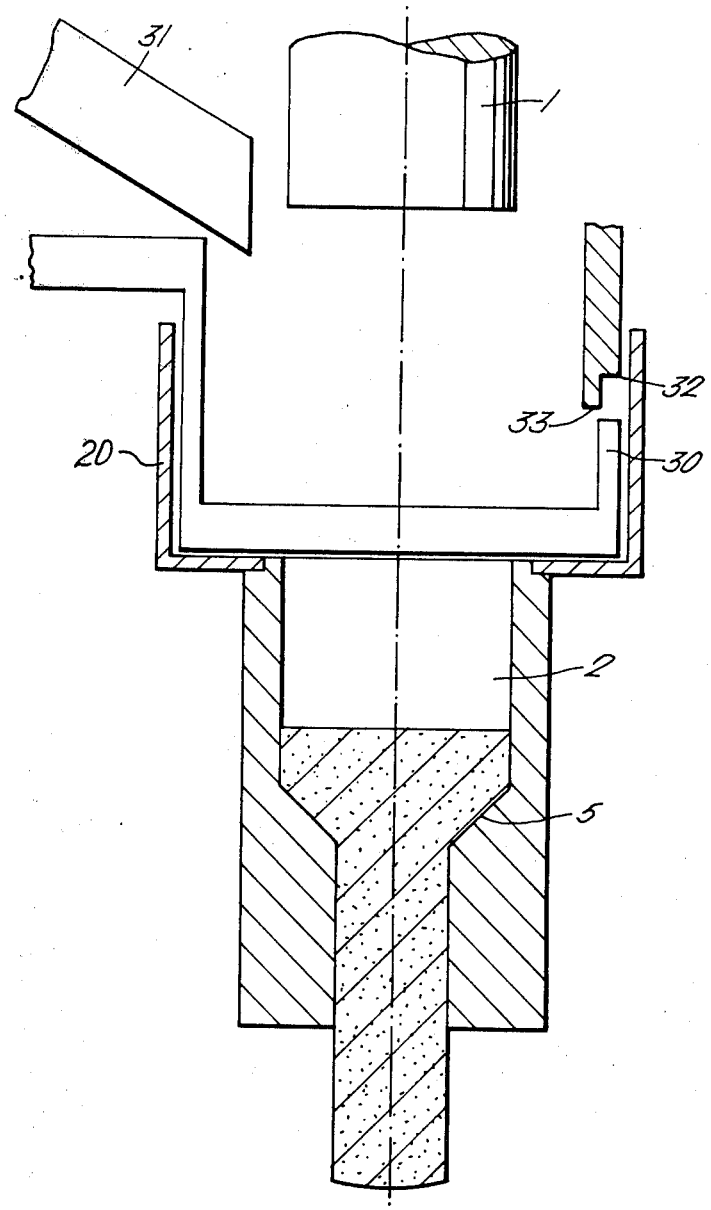
FIG. 4 is a view showing schematically and on an enlarged scale the operating end of the ram in relation to the mouth of a compression cylinder with which it co-operates.

The material to be extruded, e.g. in the form of a depolarising "black mix" as referred to previously is not shown in FIG. 1, but is contained in an annular reservoir defined between an outer cylindrical container 20 and a central member of which the upper portion is conical as seen at 21. This central member is caused to rotate at a slow speed by means of a shaft 23 driven by gearing 24 through a chain drive 25 from the shaft 11. The lower part of the cone 21 supports a paddle 30 which extends across the bottom of the container 20 and partly up the sides of the container as seen in FIG. 1. Black mix is supplied to the reservoir by means of a pipe 31 seen in FIG. 4, the level being maintained sufficiently low to allow the ram 1 to clear the surface of the mix when it is at its top dead-centre position. This is achieved by high- and low-level controls shown diagrammatically as 32 and 33 respectively which reduce or increase the supply as necessary in a well known manner.

As will be described in more detail with reference to all of the figures, including FIGS. 6 to 14, a quantity of mix is consolidated in the cylinder 2 and extruded through the nozzle 3 into a can 35 held by a holder 36, which elements are shown schematically in FIG. 1, and in greater detail in FIG. 5. Referring to FIG. 5, the holder 36 is controlled by a cam 37 which co-operates with a follower 38 on an arm 39 which is pivoted at its lower end at 40 and is pressed against the cam 37 by a spring 41. It will be appreciated that the position of the holder 36 is controlled at all times by the contour of the cam 37 and that the only function of the spring 41 is to hold the follower 38 against the cam 37. It is an essential feature of the operation that the follower 38 should not leave the cam 37 and the spring 41 must be strong enough for this purpose. As an alternative, a box cam or similar mechanism may be used so as to exert positive control over the movement of the follower 38 in both directions.

The arm 39 is connected at its upper end at 42 to the holder 36 which is thus caused to slide on a rod 43 extending from a support 44. In the position shown in FIGS. 1 and 5, the holder 36 is in its extreme leftward position corresponding to the uppermost position of the ram 1. As the ram 1 descends, the holder 36 and the can 35 move to the right until, just as extrusion starts, the end of the nozzle 3 is close to the bottom of the can 35. As extrusion proceeds, the can 35 moves away to the left again at a rate proportional to the rate of movement of the ram 1 as previously described. Since the cam 37 is driven via chains 46 and 47 from the gearing 24 and hence from the shaft 11 which also drives the ram, the movement of the cam is mechanically tied to that of the ram. At the completion of extrusion, the can 35 is transferred laterally (i.e. perpendicular to the plane of the paper) by a means, shown schematically at 57 in FIG. 5, and is replaced by a fresh, empty can in readiness for the next cycle of operation. The details of means for inserting and removing can 35 are apparent to one of ordinary skill in the art and are therefore not shown in detail. In other words, the extrusion head illustrated constitutes one of a number of operating stations in which successive operations such as lining and so forth are carried out.

The construction of the lower end of the ram 1 is shown in FIGS. 2 and 3. The end of the ram is formed with a recess 50 which is formed at the top with a pair of slots or openings 51 which serve as bleed ports, as will be described in more detail with reference to FIGS. 6 to 14. An outer sleeve 52 fitted over the outer surface of the ram is mounted for rotation on the end of the ram and is similarly slotted with slots 53. When the slots 53 in the sleeve 52 are in register with slots 51 in the main body of the ram 1, as illustrated on the right side of FIG. 3, the open slot length is a maximum and the slot opening extends for 120° of the circumference. When the sleeve 52 is rotated from this position, the slots opening is progressively closed and, as shown in FIG. 2 and the left side of FIG. 3, the minimum slot opening extends for 60° of the circumference. This adjustment affects the amount of bleeding obtained and depends upon the nature of the mix being extruded.

FIG. 6 illustrates the conditions just before the ram 1 reaches its top dead center position. In this position, the paddle 30 is moving from the left and is in the process of sweeping a quantity of mix indicated as 55 into the top of the compression cylinder 2. In the position of FIG. 7, the ram 1 has started to move in a downward direction and the paddle 30 has moved to the far side of the compression cylinder 2, leaving excess mix 55 above the top of the cylinder 2. It will be understood that the upper surface of the mix 55 is just below the lower end of the ram 1 so that the amount of mix forced into the cylinder 2 is not accurately predetermined in any way. By the time the position of FIG. 8 is reached, the bottom of the ram 1 has reached the top of the cylinder 2 and preconsolidated mix in the recess 50 is in contact with relatively loose mix which has not yet been consolidated.

FIG. 9 shows the position in which the bleed opening 51 is just above the top of the compression cylinder 2, the proportions of the components being such that at this stage the mix has been compressed to its terminal density, i.e. as described previously the maximum density which can be achieved without expressing water from the mix. As a consequence, further downward movement into the position of FIG. 10 results in excess mix being bled out through the openings 51 until the position of FIG. 11 is reached when the openings 51 are closed by the top of the cylinder 2 and bleeding stops. At this stage, all the material between the compression cylinder 2 and the nozzle (i.e. nozzle 3 in FIG. 1) is at its terminal density and extrusion from the nozzle then begins. No extrusion is produced before this point is reached owing to the presence of the restriction 5. Consequently the movement of the ram 1 between the positions of FIGS. 6 and 11 serves to consolidate the mix against the resistance provided by the restriction 5, but after this point, when the density is uniform throughout, extrusion starts.

FIG. 13 shows the lowest position of the ram, i.e. just before it reaches the restriction 5. During movement between the positions of FIGS. 11 and 13, a slug of mix has been extruded into a can (i.e. can 35 in FIG. 1) which moves away from the nozzle 3 (FIG. 1) as it receives the slug as previously described. Upward movement of the ram from the position of FIG. 13 to that of FIG. 14 leaves consolidated mix in the compression cylinder 2 as indicated at 60 while a further portion remains within the recess 50 as previously described. Upward movement of the ram 1 then continues until the position of FIG. 6 is again reached and the cycle is repeated.

As already described, the ram is capable of adjustment in relation to the links 15 by means of the screw 17 and this affects the depth to which the ram 1 descends into the compression cylinder 5 and hence the total volume of slug extruded. Adjustment of the area of the bleed opening 51 adjusts the ratio of pressure required to bleed to the pressure required to extrude.

The normal composition of black mix used is found to be very corrosive and it is therefore important that all components in the system should be resistant to it and that the surfaces defining the extrusion path should have a smooth surface finish. In practice, it is found that the most suitable materials for the curved passage 4 between the compression cylinder 2 and the nozzle 3, are those of a non-corrosible nature, e.g. alloys of titanium, cobolt, tungsten, chromium or glass.

As mentioned originally and as illustrated in the drawings, the method is primarily applicable to the insertion of a slug of depolarising material in a cell of the Leclanche type. In other types of cell, it may be necessary to insert a slug of different configuration and, if so, the nozzle 3 needs to be modified accordingly. As already mentioned, the system illustrated in FIGS. 1 to 14 includes a single extrusion head forming one of a series of operating stations. If multiple filling positions are required, a number of extrusion heads may be caused to operate in parallel.

A modified form of apparatus for this purpose may operate on the carousel or turntable principle, the actual method of injection of the material being identical to that already described. Thus a number of separate extrusion heads, each comprising essentially the same components as illustrated in FIG. 1, may be mounted on a turntable so as to move around a circular path while corresponding cans carried by respective holders move around the same path beneath the extrusion heads. The reciprocating movement of each ram and the relative movement between each nozzle and its respective cam may then be controlled by stationary face cams extending around the common circular path, rather than by cams and levers as previously described. With such a modified form of apparatus it is convenient for each nozzle to be in line with the respective ram so that the of curve passage 4 of FIG. 1 is eliminated. Such a form of apparatus is not illustrated, but embodies the same inventive principle as that previously described.

We claim:

1. A method for filling a container having an open mouth and a bottom, with a slug of powdery material, for subsequently forming an electrical dry cell, comprising:
    (a) feeding from a reservoir said powdery material into a cylinder having an inlet connected to a passage having a downstream restriction, followed by an exit nozzle,
    (b) moving a reciprocating ram during a first part of the stroke towards said inlet to consolidate said powdery material and to urge said powdery material against said restriction,
    (c) effecting relative movement between the nozzle and the container until said exit nozzle is adjacent the bottom of said container, and
    (d) extruding a slug of said powdery material from said exit nozzle into said container, during a second part of the stroke of said ram while progressively separating said container from said exit nozzle at a rate wherein the rate of increase of available volume in the container as it moves relative to the nozzle does not exceed the rate of extrusion of said slug from said exit nozzle, to thereby fill said container with said powdery material by a single stroke of said ram as said container is so relatively moved.

2. The method of claim 1, wherein said powdery material is "black mix" depolarizer, and said container is a paper-lined zinc can for a dry cell of the Leclanche type.

3. The method of claim 1, wherein, in the step (d) said container is moved under a direct and constant mechanical control.

4. The method of claim 2, wherein said ram has a working end and an outer surface, and wherein in said step (b),
    (e) bleeding "black mix" through at least one bleed hole extending between a recess in said working end and said outer
    surface of said ram, and prior to said step (d),
    (f) closing said bleed hole by movement of said ram to inject thereafter during step (d) a substantially constant volume of "black mix" into said container for each stroke of the ram.

* * * * *